United States Patent
DeSimone et al.

(10) Patent No.: US 10,157,124 B1
(45) Date of Patent: Dec. 18, 2018

(54) METHOD, APPARATUS, AND SYSTEM FOR MANAGING DATA STORAGE WITH AN APPLICATION PROGRAMMING INTERFACE

(71) Applicant: EMC IP Holding Company LLC, Hopkinton, MA (US)

(72) Inventors: Salvatore DeSimone, Woodbury, CT (US); Edgar J. St. Pierre, Venice, FL (US); Frederick A. Crable, Allen, TX (US); Vinodh Ravindran, San Jose, CA (US); Won T. Cho, San Mateo, CA (US); Puneet B. Lal, Shrewsbury, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 13/631,190

(22) Filed: Sep. 28, 2012

(51) Int. Cl.
*G06F 12/02* (2006.01)
*G06F 9/00* (2006.01)
*G06F 12/00* (2006.01)

(52) U.S. Cl.
CPC ............... *G06F 12/02* (2013.01); *G06F 9/00* (2013.01); *G06F 12/00* (2013.01)

(58) Field of Classification Search
CPC ...................................................... G06F 12/02
USPC ...................................................... 711/1–200
See application file for complete search history.

(56) References Cited

U.S. PATENT DOCUMENTS

| 8,185,497 B2 * | 5/2012 | Vermeulen et al. ......... 707/626 |
| 2011/0238857 A1 * | 9/2011 | Certain et al. ................ 709/232 |
| 2013/0159637 A1 * | 6/2013 | Forgette et al. ............. 711/154 |

* cited by examiner

*Primary Examiner* — David Yi
*Assistant Examiner* — Zubair Ahmed
(74) *Attorney, Agent, or Firm* — Krishnendu Gupta; Konrad R. Lee

(57) ABSTRACT

A method, system, and computer program product for providing data services, using a single control path, on a data storage resource selected from a plurality of heterogeneous storage resources, the computer-executable method comprising receiving an input relating to data services, analyzing the input to determine an appropriate type of data service to provide on the data storage resource, and based on the analyzing, providing the appropriate type of data service on the data storage resource.

33 Claims, 11 Drawing Sheets

METHOD, APPARATUS, AND SYSTEM FOR MANAGING DATA STORAGE WITH AN APPLICATION PROGRAMMING INTERFACE

APPLICATION PROGRAM INTERFACE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This Application is related to U.S. patent application Ser. No. 13/630,455 entitled "SINGLE CONTROL PATH", Ser. No. 13/631,030 entitled "METHOD AND APPARATUS FOR FEDERATING A PLURALITY OF ONE BIG ARRAYS", Ser. No. 13/631,039 entitled "METHOD AND APPARATUS FOR AUTOMATED INFORMATION LIFECYCLE MANAGEMENT USING A FEDERATION OF ARRAYS", Ser. No. 13/631,055 entitled "METHOD AND APPARATUS FOR FEDERATED IDENTITY AND AUTHENTICATION SERVICES", Ser. No. 13/631,214 entitled "AUTOMATED POLICY BASED SCHEDULING AND PLACEMENT OF STORAGE RESOURCES", Ser. No. 13/631,246 entitled "DISTRIBUTED SYSTEM SOFTWARE INFRASTRUCTURE" filed on even date herewith, the teachings of which applications are hereby incorporated herein by reference in their entirety.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A method, system, and computer program product for providing data services, using a single control path, on a data storage resource selected from a plurality of heterogeneous storage resources, the computer-executable method comprising receiving an input relating to data services, analyzing the input to determine an appropriate type of data service to provide on the data storage resource, and based on the analyzing, providing the appropriate type of data service on the data storage resource.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
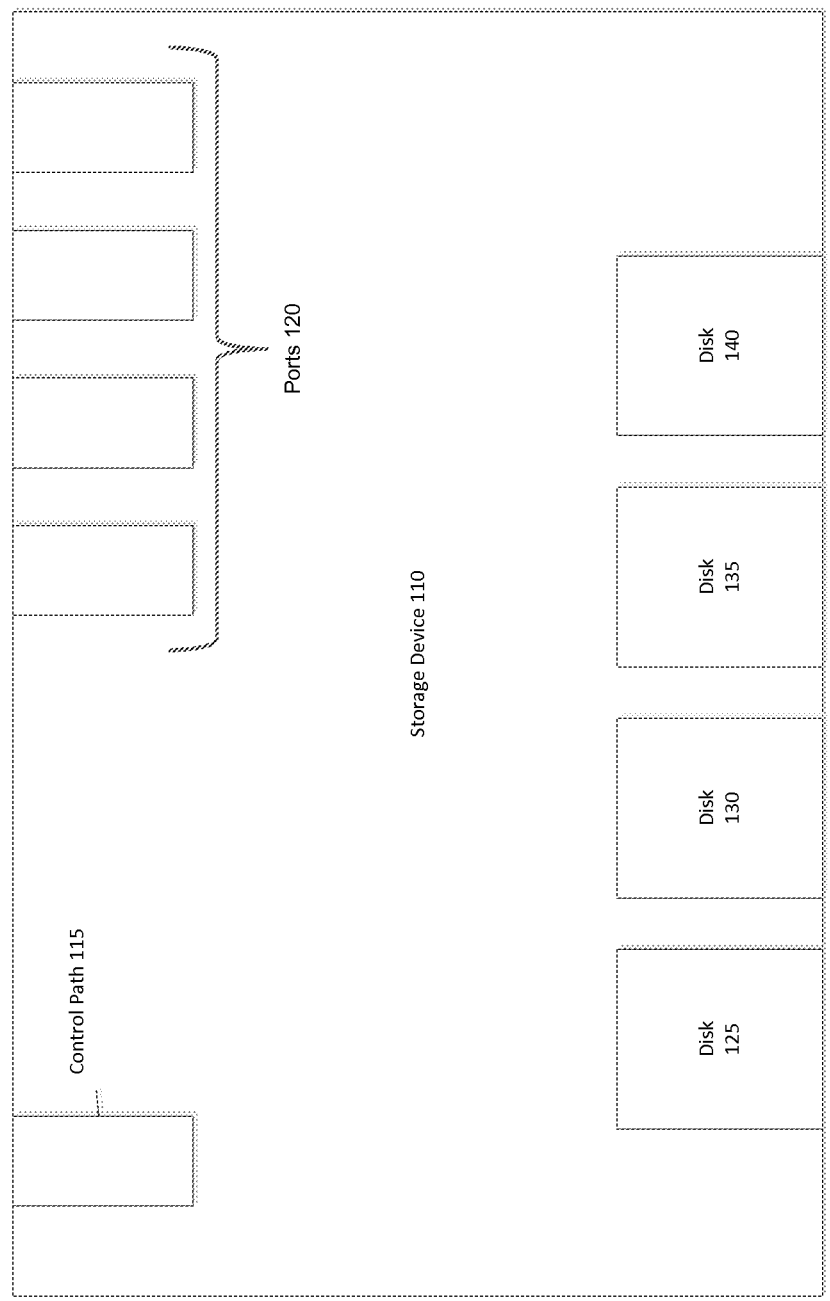
FIG. 1 is a simplified illustration of a data storage device, in accordance with an embodiment of the present disclosure.

Typically, control of and provisioning of multiple data services for heterogeneous storage systems may be problematic. Conventionally, some systems may have only enabled provisioning of homogenous storage systems. Generally, controlling provisioning of heterogeneous storage may not have been possible. Conventionally, providing different types of data services for heterogeneous storage may not have been possible.

In certain embodiments, the current disclosure may enable a distributed software control platform that allows enterprise IT departments and cloud service providers to convert the heterogeneous storage systems within a data center into one large storage array. In some embodiments, the current disclosure may enable exposure of logical storage resources and allow enterprise IT departments and cloud service providers to manage heterogeneous storage environments through a simple, robust Representational State Transfer (REST) API and a command-line interface (CLI). In at least one embodiment, one API and one CLI may be used to connect to all the storage arrays in a data center as if they were one large storage array.

In some embodiments, the current disclosure may enable a software platform for multi-tenant environments that delivers a single logical, cloud-scale, geo-distributed storage system for developers and storage/cloud administrators. In certain embodiments, the current disclosure may enable an enterprise to adopt hybrid management models in environments where storage infrastructure resides in enterprise data centers, but is also hosted by a service provider or a public cloud. In certain embodiments, the current disclosure may enable an enterprise to manage hybrid deployments as a single storage array. In further embodiments, the current disclosure may enable one big array to scale to millions of storage volumes and file shares. In still further embodiments, the techniques and implementations described herein may be deployed as a vApp, a set of virtual machines.

In certain embodiments, the current disclosure may enable data-centric cloud infrastructures to be managed efficiently and flexibly through a data management software platform. In some embodiments, the current disclosure may simplify the management of complex, heterogeneous, geo-distributed storage resources by exposing the storage systems as logical resources through robust, easy-to-use REST API and CLI interfaces. In most embodiments, the current disclosure may provide integrations into cloud stacks such as VMware® and OpenStack™.

In certain embodiments, the following definitions may be useful:

A data service may be a service for receiving, processing, storing, and protecting data. In certain embodiments, data services provide the high-level data and storage management capabilities of the system.

A control path may be a way to establish and control access to the data.

A data path may be the path the data takes from data storage provider to data storage consumer.

A storage medium may be any medium that is capable of storing data, including, but not limited to a storage array, a storage cluster, a physical disk, a virtual disk, and a virtual storage system.

A tenant may represent an organization operating within a one big array. In some embodiments, a tenant may be created in the system for the purposes of security isolation.

An active-active data storage system may have a storage medium exposed in two locations enabling data consistency in both locations. In many embodiments, the storage medium may be accessible from both locations.

An active-passive data storage system may have an active storage medium and a passive storage medium where the passive storage medium mirrors the active storage medium. In some embodiments, if the active storage medium fails, the passive storage medium may become active.

A project may be a resource organization abstraction that maps resources to applications, virtual data centers, departments, or other entities. In some embodiments, a user may create their own projects, and may associate multiple resources from different data services with the projects. In most embodiments, resources from one project maybe shared between users under the same tenant.

A Class of Service may represent high-level capabilities and services that are created by users through composition of resource attributes and quality of services, including level of protection, availability, access protocol, performance, and additional storage/data services, such as versioning/snap, backup, remote replication, data reduction, encryption, etc.

Generally, a data storage array or system may be one or more physical boxes or a cluster of physical boxes. In conventional systems, the data storage array or system may have one control path and data paths. In typical systems, one or more data paths ports may provide data path access to the storage resources contained within the storage system. Typically, the protocols for the data path ports may be fiber channel, Internet Protocol (IP), iSCSI, NFS, or CIFS. Usually, to add more capacity to a data storage array or system, more physical disks, more inline cards, or more CPUs may be added to the data storage array or system. Conventionally, the data storage system or array may be a cluster of storage mediums. Typically, providing management for large numbers of data storage arrays or systems may be challenging.

Refer, now to the example embodiment of FIG. 1 which illustrates a sample storage device. Storage device 110 has control path 1115, ports 120, and disks 125, 130, and 135. Control path 115 enables a user to interface with storage device 110. Control path 115 enables a user to access disks 125, 130, and 135, via the services storage device 110 offers, through one or more of ports 120.

In an embodiment, the current disclosure may enable provisioning of data services across heterogeneous storage systems. In further embodiments, a data management software platform may be enabled to allow users or administrators to extract information, create, delete, and modify logical storage resources within complex heterogeneous storage resources. In certain embodiments, the current disclosure may enable an API service to allow a user to manipulate a set of heterogeneous storage resources using a set of simplified API interfaces. In many embodiments, an API service may enable a data management software platform to expose an interface to users or administrators. In some embodiments, an API service may enable a user/administrator to access information such as monitor and meter data for storage resources, tenant/subtenant information (such as role assignments), project information (such as owners and Access Control Lists (ACLs)), block, file, and/or object CoS information (such as storage pools and ACLs). In other embodiments, an API service enable access to information about block volumes (CoS, snapshot, snapshot consistency groups, exports, target port mappings for SAN zoning), block snapshots (such as exports), block export groups (such as members), file systems (such as CoS, snapshots, NFS exports, and CIFS shares), file system snapshots (such as exports), and key pools (such as keys, objects). In some embodiments, an API service may provide information about local zones (such as data services, role assignments), remote zones (such as ACLs), neighborhoods (such as storage systems, transport zones, and ACLs), transport zones (such as endpoints), storage systems (such as storage pools and ports), and logical storage pools.

In many embodiments, an API service may enable users or administrators to complete complex operations through the interpretation of concise messages or commands received by the API service. In some embodiments, an API service may cause a data management software platform to perform Multi-Volume Consistent Snapshots across multiple heterogeneous storage resources. In many embodiments, some enterprise applications may require write-order consistency across snapshots of multiple volumes. In certain embodiments, an API service may enable a user to cause write-order consistency across snapshots of multiple volumes. In some embodiments, write-order consistency across snapshots of multiple volumes may enable restoring an application to a crash-consistent state such that in the future the application state may be restored to what it was at the time of the snapshots (i.e. Relational Database Management systems (RDBMS) may require consistency of data and log volumes, or Logical Volume Managers (LVM) may require consistency of component volumes).

In many embodiments, a user/administrator may use an API, of an API Service, to enable snapshot consistency for a volume. In some embodiments, snapshot consistency may be enabled by sending one or more parameters to an API (i.e. volume create call). In certain embodiments, volumes may be created through the use of a Class of Service that supports snapshot consistency. In many embodiments, each multi-volume snapshot taken may be stored in a specified location. In some embodiments, the specified location may be the same location. In other embodiments, an API may allow a user to enable multiple volumes to be linked/grouped together. In certain embodiments, an API may enable a new volume to be linked with a previously created group of volumes. In some embodiments, an API may enable a new volume to join the same consistency group as another volume and the system may transitively compute the membership of the consistency group.

In many embodiments, a user/administrator may use an API to enable automatic creation of snapshots for volumes in the same consistency group. In certain embodiments, when a user/administrator initiates a snapshot to a volume, each volume in the same consistency group may be snapshot. In many embodiments, an API service may return additional snapshot elements indicating the snapshots that were created for each volume in the consistency group. In some embodiments, the volume snapshots created may have the same snapshot name.

For example, in an embodiment, a user/administrator may send the following commands to an API on a data management software platform to create two volumes with multi-volume snapshot consistency enabled on heterogeneous data storage resources.

1) Create_Vol (V1);
2) Create_Vol(V2, V1);
3) V1.snapshot( );
4) V2.snapshot( );

In this embodiment, command (1) creates a volume V1 and command (2) creates volume V2 while signaling to an API to enable Multi-Volume Snapshot consistency with V1. As shown, V1 and V2 are members of a consistency group. In this embodiment, the API removes the complexity of directing a data storage device in heterogeneous data storage resources. In this embodiment, a user/administrator may request multi-volume snapshot consistency without needing to know about the underlying data storage resource in the heterogeneous data storage resources. In this embodiment, a user/administrator sending may send command (3) or command (4) to the API. As shown in this embodiment, command (3) causes a data management software platform managing heterogeneous resources to take a snapshot of each volume of a consistency group simultaneously, in this case volumes V1 and V2. In this embodiment, command (2) may be repeatedly used to add one or more volumes to the consistency group including volumes V1 and V2.

In other embodiments, a user/administrator may use an API to enable an application to operate with block-level clustering in which multiple volumes may be exported to multiple hosts. In some embodiments, a user/administrator may use an API to enable clustering software at the application level to ensure that only one host is writing to the volume at a time. In many embodiments, ensuring that only one host is writing to a volume may enable an application to survive a failure of a compute node in the cluster. (i.e. an Oracle RAC cluster or Shared Data stores in a VMware ESX cluster).

For example, in an embodiment, a user/administrator may send the following commands to an API on a data management software platform to create a volume using block-level clustering on heterogeneous data storage resources.

1) Create_Vol_Export_Group(Group1, InitiatorList1, V1, V2);

In this embodiment, command (1) sent to the API creates an export group "Group1" having member volumes V1 and V2. As shown, command (1) causes member volumes of "Group1" to have port connections to initiator ports in "InitiatorList1" from one or more hosts. In this embodiment, the API removes the complexity of directing a data storage device in heterogeneous data storage resources. In this embodiment, a user/administrator may request block-level clustering without needing to know anything about the underlying data storage resource in the heterogeneous data storage resources. In this embodiment, an application in a clustered software configuration may be placed on volumes V1 and/or V2. Clustered software on a data management software platform may ensure that one host is writing to a volume at a time.

In many embodiments, a user/administrator may use an API to cause a data management software platform to create an active-active data service on heterogeneous data storage resources. In some embodiments, an active-active data service may enable creation of multiple interfaces to a logical device, where each interface may provide equal access to the logical device. In certain embodiments, each interface may access the logical device simultaneously. In other embodiments, a user/administrator may use an API to cause a data management software platform to create an active-passive data service on heterogeneous data storage resources. In some embodiments, the active-passive data service may enable multiple interfaces to access a logical device, where only one interface may be active at any given time. In certain embodiments, the data service may be implemented on heterogeneous storage resources using RecoverPoint or Symmetrix Remote Data Facility.

In many embodiments, an API may be enabled to provide functionality not supported by a data storage resource from heterogeneous storage resources. In other embodiments, a user/administrator may use an API to cause a data management software platform to enable metering and monitoring of usage of a data storage resource on heterogeneous storage resources. In many embodiments, an API may enable a user/administrator to gain access to management functions that support secure multi-tenancy isolation and auditing. In some embodiments, one or more tenants may utilize a data storage resource selected from heterogeneous storage resources. In certain embodiments, an API may enable a tenant to have an individual view of the data storage resource. In an embodiment, an individual view of one tenant may differ from an individual view of a second tenant.

In certain embodiments, a function may be enabled by an API even though an underlying data storage resource from heterogeneous data storage resources may not support the function. In some embodiments, a data storage resource V1 may be enabled to provide a file storage system and a block storage system, but not an object storage system. In certain embodiments, an API may enable data storage resource V1 to provide an object storage system even though it is not supported.

In many embodiments, a user/administrator may use an API to access a data management software platform remotely located from the API. In certain embodiments, a user may use an API from a first data management software platform to cause a second data management software platform to act. In some embodiments, the actions by the second data management software platform may include allocating, configuring, metering, and monitoring a data storage resource on heterogeneous resources remotely located from the first data management software platform. In many embodiments, one or more data management software platform may be utilized in different sized clusters covering different sized regions. In certain embodiments, a region may encompass different geographic areas or metropolitan areas. (i.e. city, state, country, continent).

Figure 2:
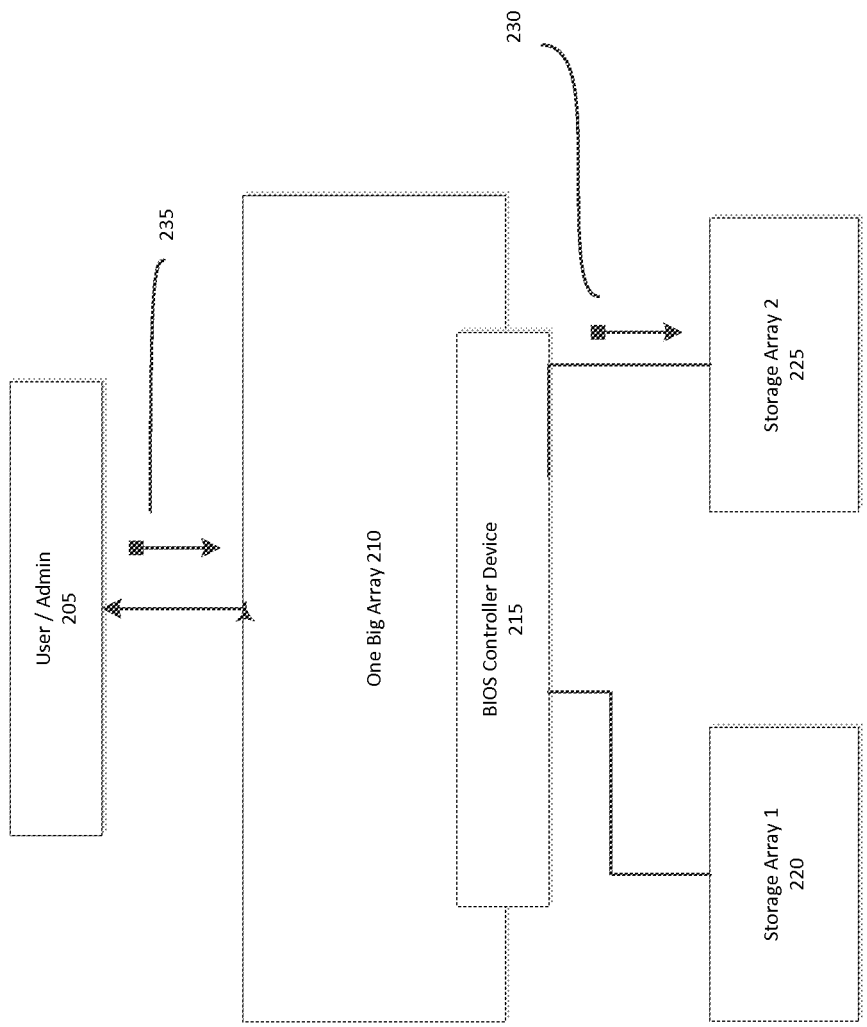
FIG. 2 is a simplified illustration of a one big array, in accordance with an embodiment of the present disclosure.

Refer now to the example embodiment of FIG. 2. FIG. 2 illustrates an example embodiment of a one big array. As shown in FIG. 2, User/Administrator 205 communicates with One Big Array 210 through a single control path. User/Administrator 205 sends provisioning request 235 to One Big Array 210 requesting provisioning of storage arrays 220, 225. One Big Array 210 processes provisioning request 235 and sends an allocation request 230 to storage array 225 to fulfill provision request 235.

Figure 3:
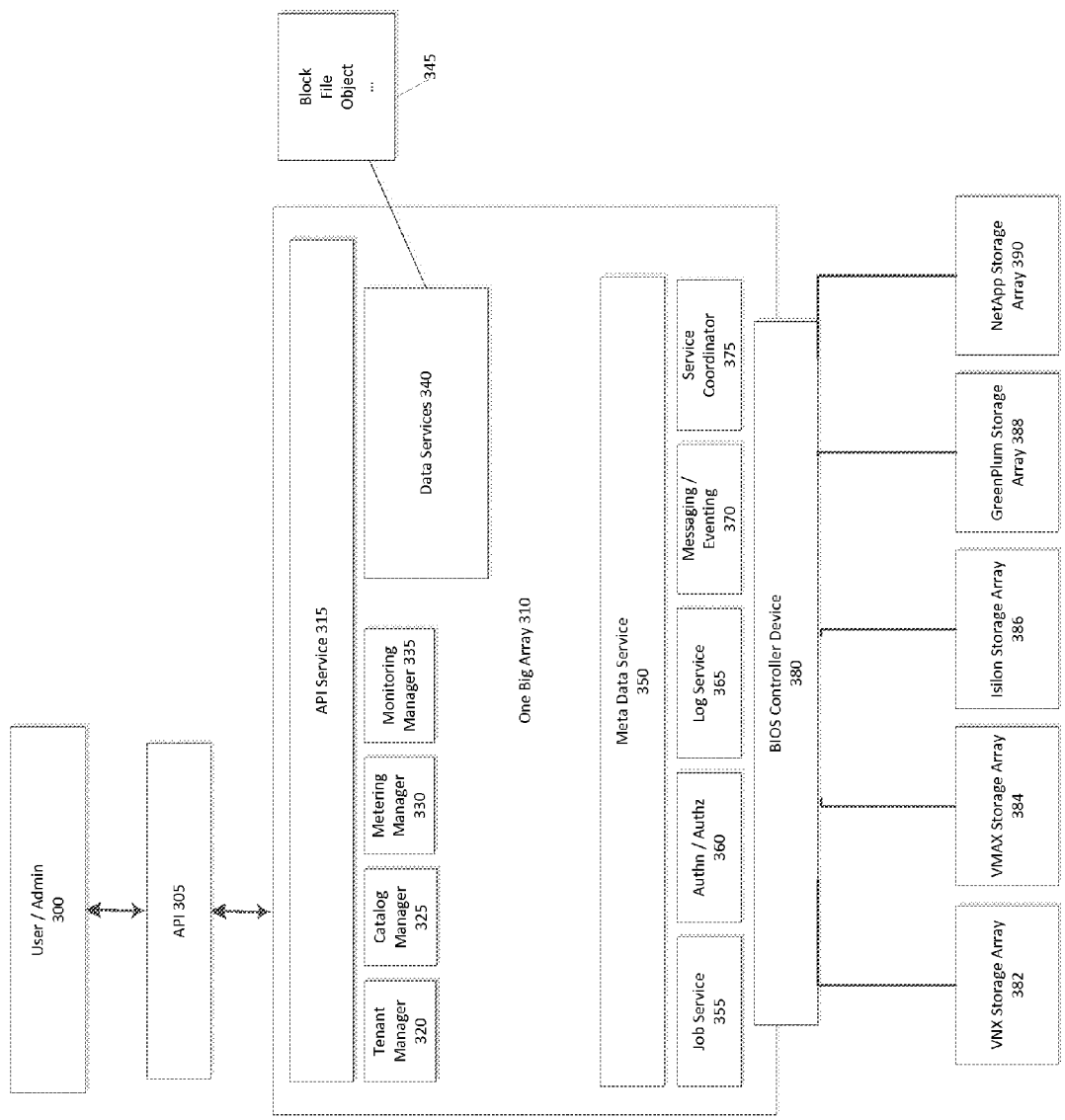
FIG. 3 is a simplified illustration of the distributed infrastructure of a one big array, in accordance with an embodiment of the present disclosure.

Refer now to example embodiment of FIG. 3. FIG. 3 is an alternative simplified illustration of a distributed infrastructure of a one big array, in accordance with an embodiment of the present disclosure. As shown in FIG. 3, API service 315 enables external access to users or administrators 300 through API 305. API service 315 communicates requests to One Big Array 310. In this embodiment, One Big Array 310 has tenant manager 320, catalog manager 325, metering manager 330, monitoring manager 335, data services 340, meta data service 350, job service 355, Authn/Authz 360, Log service 365, Messaging/Eventing 370, service coordinator 375, and bios controller device 380. As shown, data services 340, within One Big Array 310, provides block, file, and object data services 345. In many embodiments, API 305 and API service 315 may enable users or administrators 300 to complete complex operations through the interpretation of concise messages or commands received by API service 315 through API 305. In certain embodiments, API service 315 may cause complex operations to be implemented on storage arrays 382, 384, 386, 388, 390.

Figure 4:
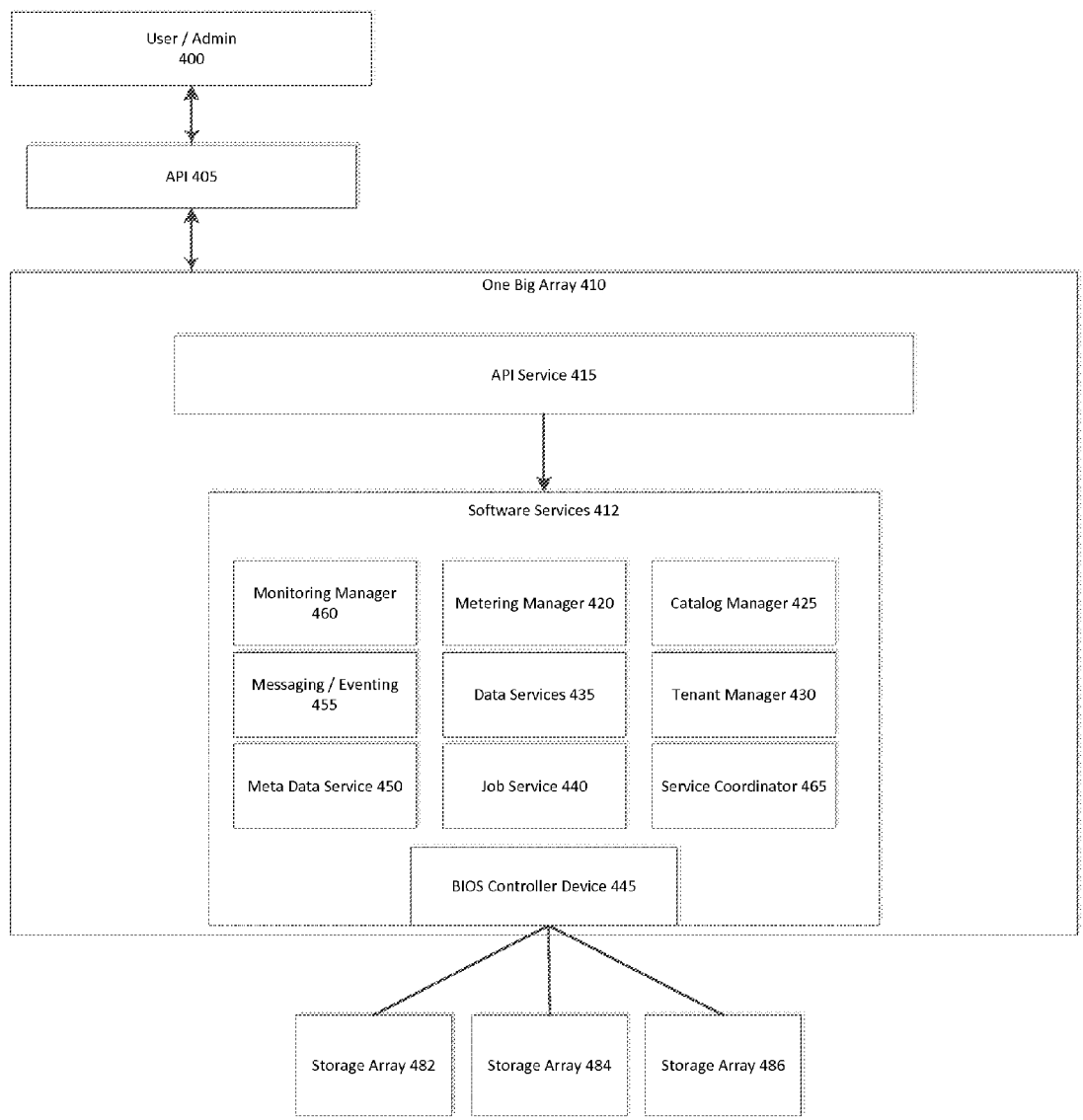
FIG. 4 is further alternative simplified illustration of the distributed infrastructure of a one big array, in accordance with an embodiment of the present disclosure.

Refer now to the example embodiment of FIG. 4. FIG. 4 is a further alternative simplified illustration of a distributed infrastructure of a one big array, in accordance with an embodiment of the present disclosure. As shown in FIG. 4, API Service 415 is enabled to access software services 412 to manage One Big Array 410 and/or provision Storage Array 482, 484, 486.

Figure 5:
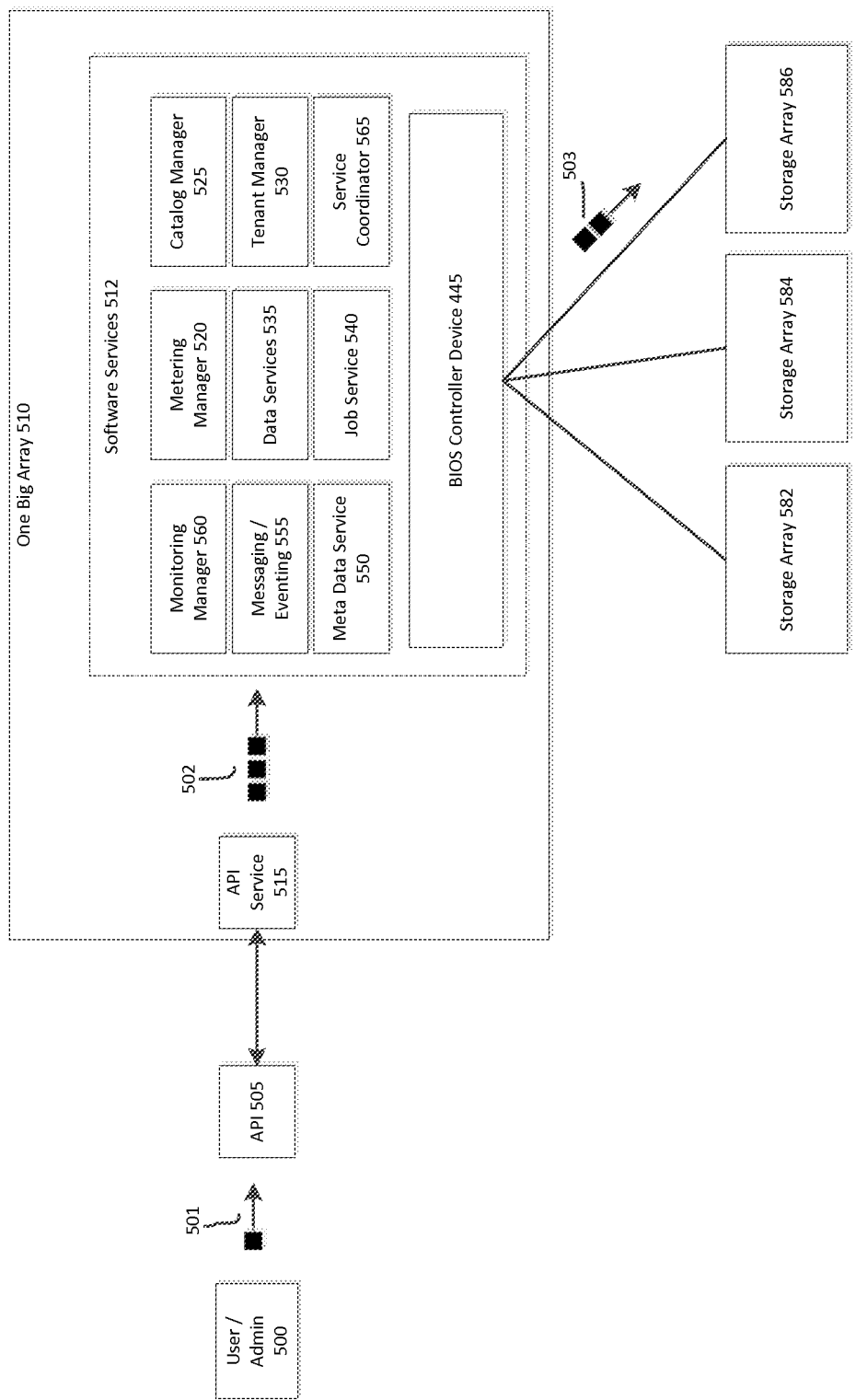
FIG. 5 is a simplified illustration of a distributed infrastructure of a one big array, in accordance with an embodiment of the present disclosure.
Figure 6:
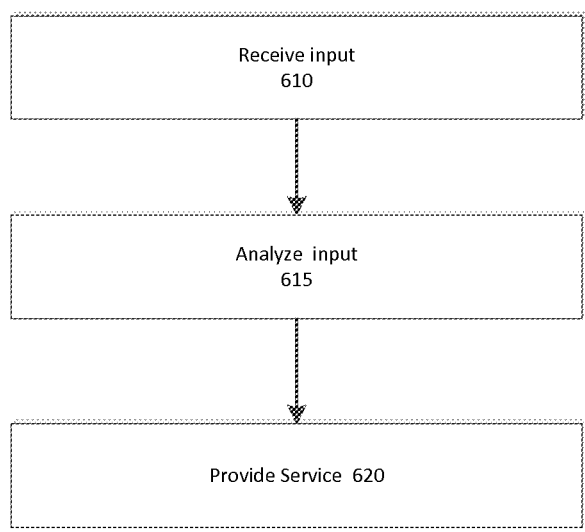
FIG. 6 is an example embodiment of a method of managing requests for a one big array, in accordance with an embodiment of the present disclosure.

Refer now to the example embodiments of FIGS. 5 and 6. The example embodiments illustrate a simplified flow of how One Big Array 510 provisions storage for a storage request. As shown in FIG. 5, user/administrator 500 transmits message 501 to API 505. API service 515 receives input message 501 through API 505 (Step 610). In this embodiment, Message 501 includes information relating to data services on One Big Array 510. API service 515 analyzes input message 501 to determine the type of service requested by user/administrator 500. (Step 615). In certain embodiments, API service 515 may translate the request into one or more of command messages 502 to cause One Big Array 510 to implement the requested action. As shown, command message 502 is sent to software services 512 to fulfill the request. Software services 512 sends message 503 to cause storage array 586 to fulfill the request made by the user/administrator 500. In some embodiments, fulfilling the request may enable providing an appropriate type of data service on a data storage resource (Step 620). In many embodiments, API service 515 may enable user/administrator 500 to perform multi-volume consistent snapshots on heterogeneous storage resources, such as One Big Array 710. In some embodiments, API service 515 may enable user/administrator 500 to provision applications to operate with block-level clustering on heterogeneous storage resources, such as One Big Array 710.

Figure 7:
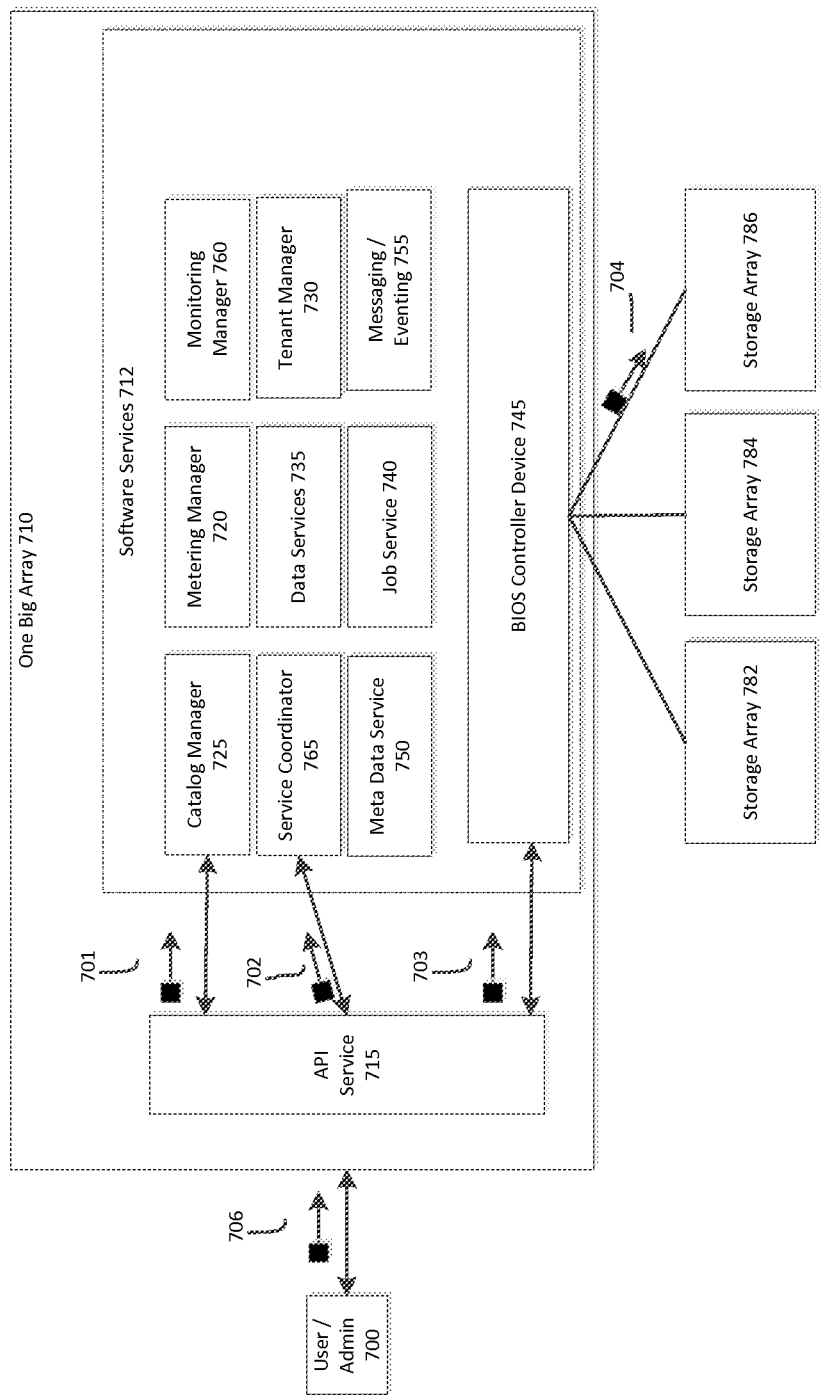
FIG. 7 is an alternate simplified illustration of a distributed infrastructure of a one big array, in accordance with an embodiment of the present disclosure.
Figure 8:
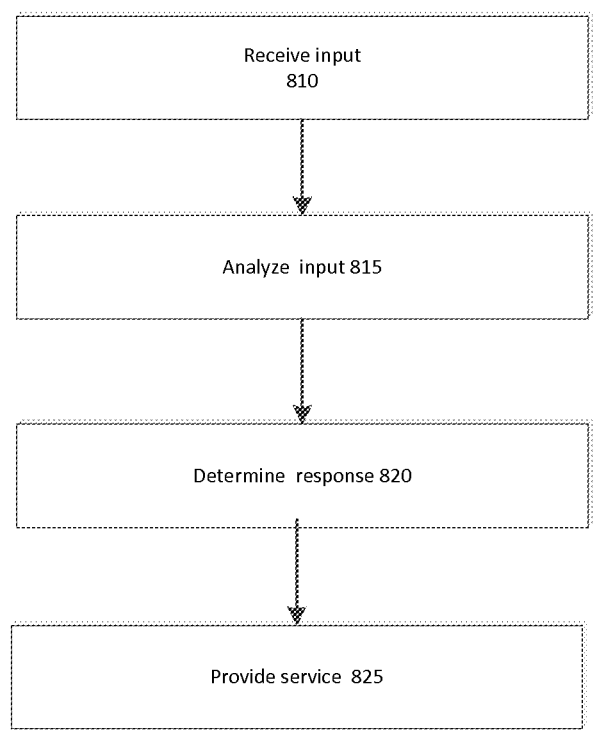
FIG. 8 is a further example embodiment of a method of managing requests for a one big array, in accordance with an embodiment of the present disclosure.

Refer now to the example embodiments of FIGS. 7 and 8. The example embodiments illustrate a simplified flow of how One Big Array 710 provisions storage for a storage request. As shown in FIG. 7, API service 715 receives input message 706 from user/administrator 700 (Step 810). In this embodiment, message 706 includes request for provisioning of data services on One Big Array 710. API service 715 analyzes received input (Step 815) and determines which service is being requested and determines response (Step 820). In some embodiments, user/administrator 700 may request a multi-volume consistent snapshot of data volumes located on storage array 786. As shown, API Service 715 sends command messages 701, 702, 703 to communicate with software services 712 to provide service (Step 825) on a data storage resource selected from heterogeneous storage resources. In this embodiment, API service 715 communicates with catalog manager 725 to determine which of the available data storage arrays 782, 784, 786 is enabled to support a multi-volume consistent snapshot. API service 715 communicates with service coordinator 765 to gain access to BIOS Controller Device 745. As shown, API Service 715 causes BIOS Controller Device 745 to send message 704 to cause Storage Array 786 to allocate a volume enabled to support a multi volume consistent snapshot.

Figure 9:
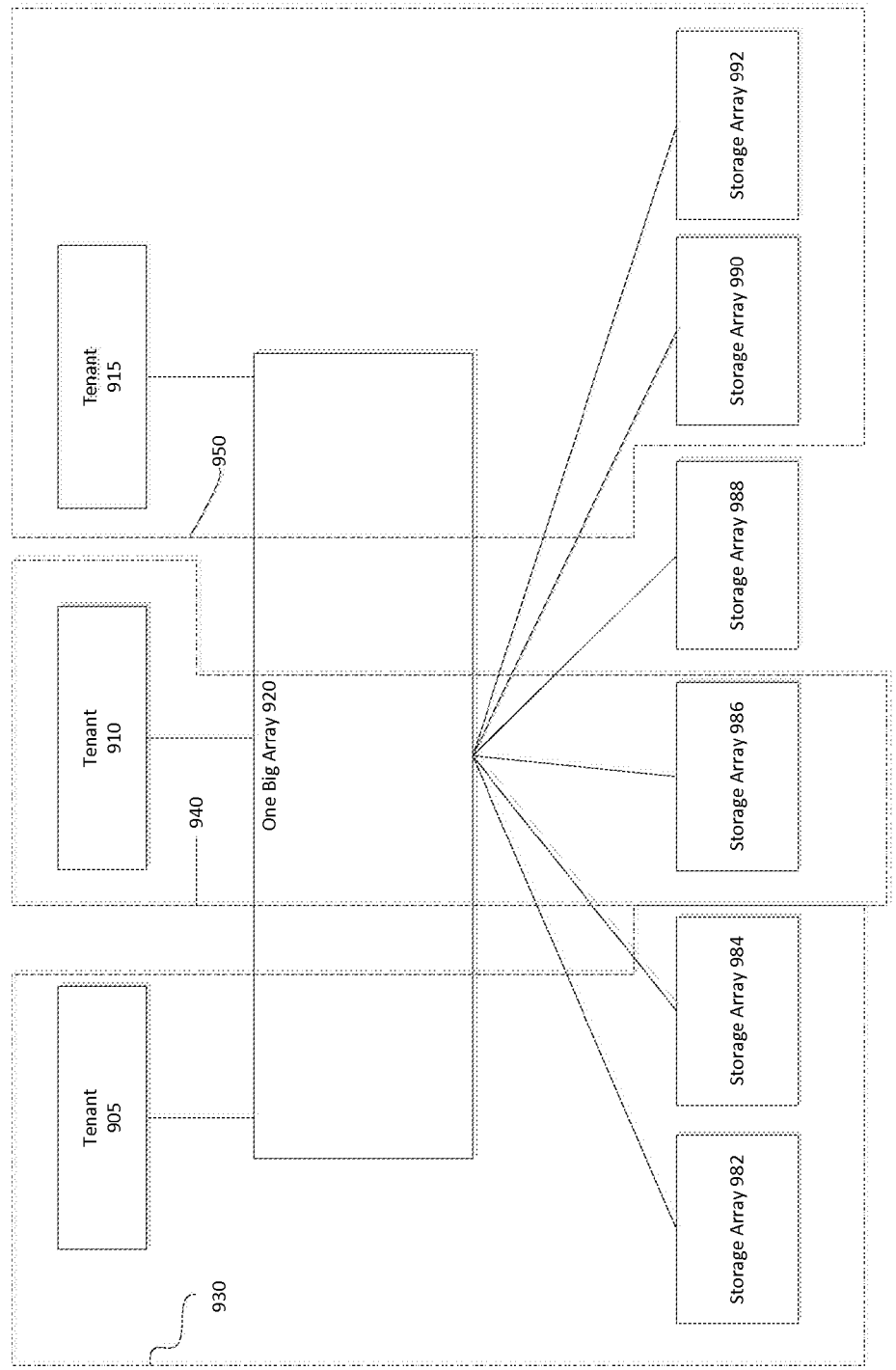
FIG. 9 is a simplified illustration of a distributed infrastructure of a one big array, in accordance with an embodiment of the present disclosure.

Refer now to the example embodiments of FIG. 9. The example embodiment illustrates how One Big Array 920 may support multi-tenancy. As shown in FIG. 9, Tenants, 905, 910, 915 communicate with One Big Array 920 to utilize storage arrays 982, 984, 986, 988, 990, 992. In this embodiment, each tenant has an individual view of storage arrays 982, 984, 986, 988, 990, 992. Tenant 905 has individual view 930 enabling tenant 905 to use storage arrays 982, 984. Tenant 910 has individual view 940 enabling tenant 9010 to use storage array 986. Tenant 915 has individual view 930 enabling tenant 915 to use storage arrays 990, 992. Tenant 905 is not able to see the storage available to tenant 910 or tenant 915. Likewise, tenant 910 is not able to see the storage available to tenants 905 or 915. Tenant 915 is not able to see the storage available to tenant 910 or 915.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 10:
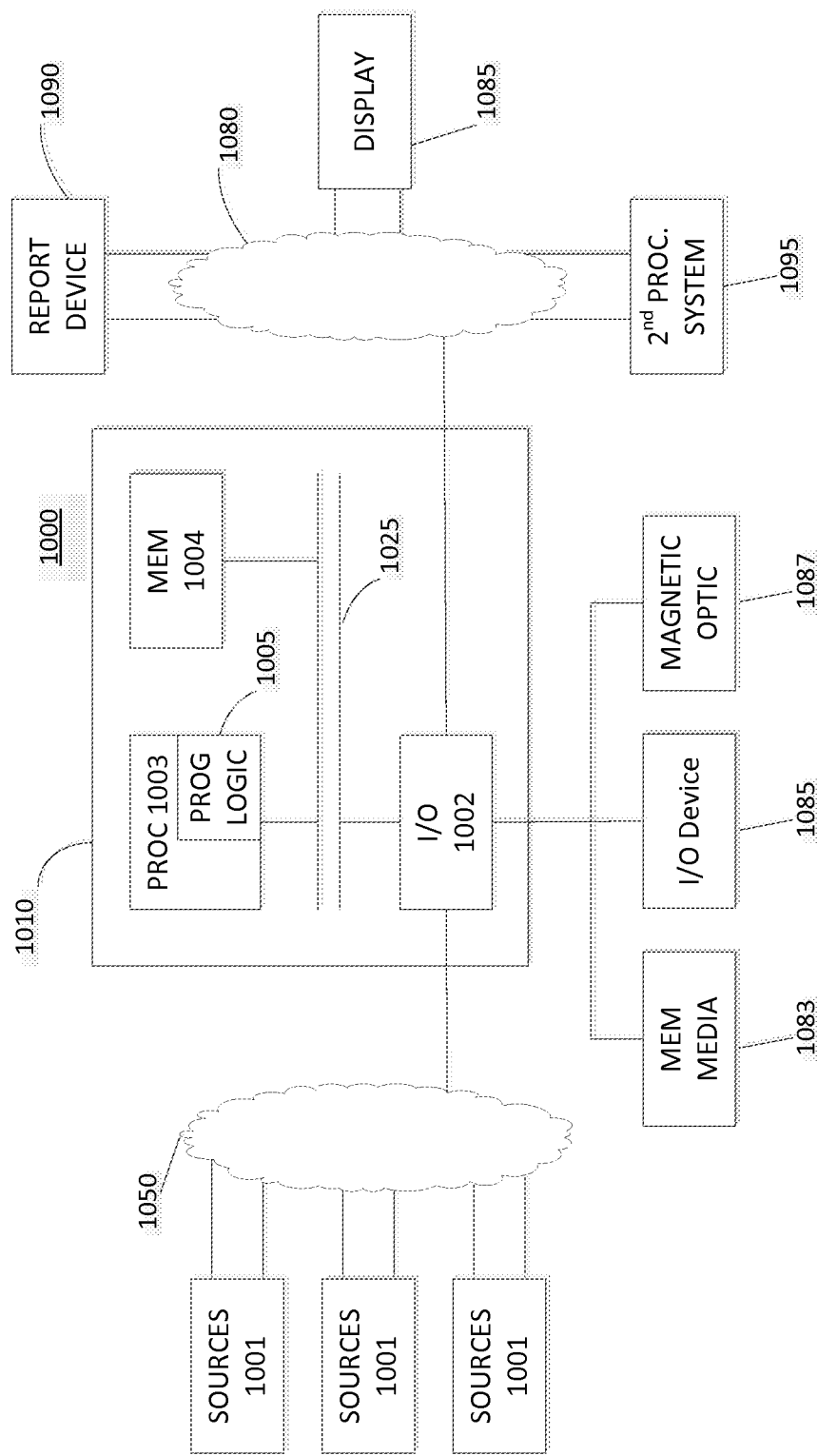
FIG. 10 is an example of an embodiment of an apparatus that may utilize the techniques described herein, in accordance with an embodiment of the present disclosure.

FIG. 10 is a block diagram illustrating an apparatus, such as a computer 1010 in a network 1000, which may utilize the techniques described herein according to an example embodiment of the present invention. The computer 1010 may include one or more I/O ports 1002, a processor 1003, and memory 1004, all of which may be connected by an interconnect 1025, such as a bus. Processor 1003 may include program logic 1005. The I/O port 1002 may provide connectivity to memory media 1083, I/O devices 1085, and drives 1087, such as magnetic or optical drives. When the program code is loaded into memory 1004 and executed by the computer 1010, the machine becomes an apparatus for practicing the invention. When implemented on one or more general-purpose processors 1003, the program code combines with such a processor to provide a unique apparatus that operates analogously to specific logic circuits. As such, a general purpose digital machine can be transformed into a special purpose digital machine.

Figure 11:
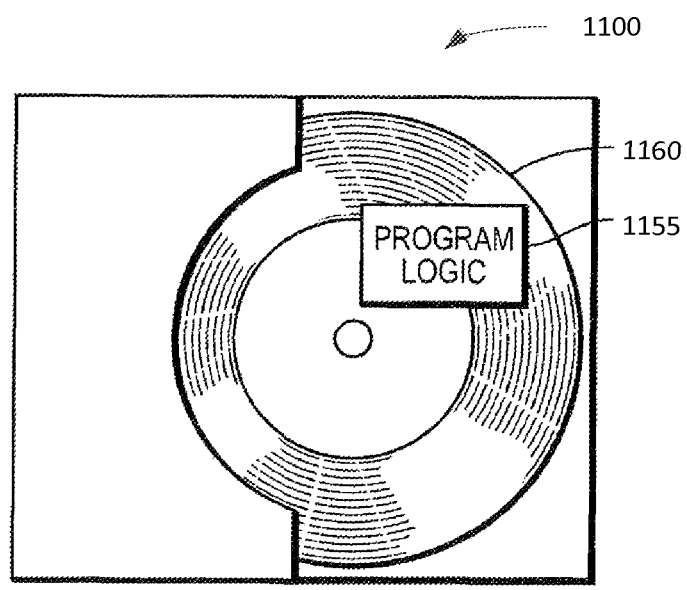
FIG. 11 is an example of a method embodied on a computer readable storage medium that may utilize the techniques described herein, in accordance with an embodiment of the present disclosure.

FIG. 11 is a block diagram illustrating a method embodied on a computer readable storage medium 1160 that may utilize the techniques described herein according to an example embodiment of the present invention. FIG. 11 shows Program Logic 1155 embodied on a computer-readable medium 1160 as shown, and wherein the Logic is encoded in computer-executable code configured for carrying out the methods of this invention and thereby forming a Computer Program Product 1100. Program Logic 1155 may be the same logic 1005 on memory 1004 loaded on processor 1003 in FIG. 10. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-11. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method for providing data services from a data storage system, using a single control path, on a data storage resource selected from a plurality of heterogeneous storage resources in communication with the data storage system, the computer-executable method comprising:
   receiving, via the single control path, an input related to data services;
   analyzing the input to determine an appropriate type of data service to provide on the data storage resource, wherein the input is enabled to indicate a request for a complex operation;
   wherein the plurality of heterogeneous storage resources includes a first type of data storage resource enabled to provide a first set of data services; wherein the data storage system is enabled to provide a second set of data services which includes the first set of data services
   wherein the data storage system is enabled to provide a data services not supported by the plurality of heterogeneous storage resources in communication with the data storage system; and
   based on the analyzing, providing the appropriate type of data service on the data storage resource, wherein the appropriate type of data service is included in the second set of data services and not included in the first set of data services.

2. The computer-executable method of claim 1, wherein implementing the appropriate type of data service on the data storage resource comprises configuring the appropriate type of data service.

3. The computer-executable method of claim 1, wherein implementing the appropriate type of data service on the data storage resource comprises monitoring the data storage resource.

4. The computer-executable method of claim 1, wherein implementing the appropriate type of data service on the data storage resource comprises metering the data storage resource.

5. The computer-executable method of claim 1, wherein implementing the appropriate type of data service on the data storage resource comprises retrieving information from the data storage resource.

6. The computer-executable method of claim 1, wherein implementing the appropriate type of data service on the data storage resource comprises allocating the appropriate type of data service requested on the data storage resource.

7. The computer-executable method of claim 1, wherein implementing the appropriate type of data service on the data storage resource comprises allocating a multi-volume consistent snapshot service.

8. The computer-executable method of claim 1, wherein implementing the appropriate type of data service on the data storage resource comprises allocating a block-level clustering service.

9. The computer-executable method of claim 1, wherein the type of data services is selected from the group consisting of block storage services, object storage services, file storage services, secure multi-tenancy isolation, and auditing services.

10. The computer-executable method of claim 1, wherein the type of data service is managed on a remotely located storage resource.

11. The computer-executable method of claim 1, wherein analyzing the input to determine an appropriate type of data service to provide on the data storage resource comprises associating the received input with an available type of data service on the data storage resource.

12. A system, comprising:
   one or more data storage arrays having a data storage resource from heterogeneous storage resources, available for provisioning from a data storage system in communication with the one or more data storage arrays; and
   computer-executable logic encoded in memory of one or more computers in communication with the available data storage resource, wherein the computer-executable program logic is configured for the execution of:
      receiving an input related to data services;
      analyzing the input to determine an appropriate type of data service to provide on the data storage resource, wherein the input is enabled to indicate a request for a complex operation;
      wherein the plurality of heterogeneous storage resources includes a first type of data storage resource enabled to provide a first set of data services;

wherein the data storage system is enabled to provide a second set of data services which includes the first set of data services;
wherein the data storage system is enabled to provide a data services not supported by the plurality of heterogeneous storage resources in communication with the data storage system; and
based on the analyzing, providing the appropriate type of data service on the data storage resource, wherein the appropriate type of data service is included in the second set of data services and not included in the first set of data services.

13. The system of claim 12, wherein implementing the appropriate type of data service on the data storage resource comprises configuring the appropriate type of data service.

14. The system of claim 12, wherein implementing the appropriate type of data service on the data storage resource comprises monitoring the data storage resource.

15. The system of claim 12, wherein implementing the appropriate type of data service on the data storage resource comprises metering the data storage resource.

16. The system of claim 12, wherein implementing the appropriate type of data service on the data storage resource comprises retrieving information from the data storage resource.

17. The system of claim 12, wherein implementing the appropriate type of data service on the data storage resource comprises allocating the appropriate type of data service requested on the data storage resource.

18. The system of claim 12, wherein implementing the appropriate type of data service on the data storage resource comprises allocating a multi-volume consistent snapshot service.

19. The system of claim 12, wherein implementing the appropriate type of data service on the data storage resource comprises allocating a block-level clustering service.

20. The system of claim 12, wherein the type of data services is selected from the group consisting of block storage services, object storage services, file storage services, secure multi-tenancy isolation, and auditing services.

21. The system of claim 12, wherein the type of data service is managed on a remotely located storage resource.

22. The system of claim 12, wherein analyzing the input to determine an appropriate type of data service to provide on the data storage resource comprises associating the received input with an available type of data service on the data storage resource.

23. A computer program product for providing data services from a data storage system, using a single control path, on a data storage resource from heterogeneous storage resources in communication with the data storage system, the computer program product comprising:
a non-transitory computer readable medium encoded with computer-executable program code for using read signatures in replication, the code configured to enable the execution of:
receiving an input related to data services;
analyzing the input to determine an appropriate type of data service to provide on the data storage resource, wherein the input is enabled to indicate a request for a complex operation;
wherein the plurality of heterogeneous storage resources includes a first type of data storage resource enabled to provide a first set of data services;
wherein the data storage system is enabled to provide a second set of data services which includes the first set of data services;
wherein the data storage system is enabled to provide a data services not supported by the plurality of heterogeneous storage resources in communication with the data storage system; and
based on the analyzing, providing the appropriate type of data service on the data storage resource, wherein the appropriate type of data service is included in the second set of data services and not included in the first set of data services.

24. The computer program product of claim 23, wherein implementing the appropriate type of data service on the data storage resource comprises configuring the appropriate type of data service.

25. The computer program product of claim 23, wherein implementing the appropriate type of data service on the data storage resource comprises monitoring the data storage resource.

26. The computer program product of claim 23, wherein implementing the appropriate type of data service on the data storage resource comprises metering the data storage resource.

27. The computer program product of claim 23, wherein implementing the appropriate type of data service on the data storage resource comprises retrieving information from the data storage resource.

28. The computer program product of claim 23, wherein implementing the appropriate type of data service on the data storage resource comprises allocating the appropriate type of data service requested on the data storage resource.

29. The computer program product of claim 23, wherein implementing the appropriate type of data service on the data storage resource comprises allocating a multi-volume consistent snapshot service.

30. The computer program product of claim 23, wherein implementing the appropriate type of data service on the data storage resource comprises allocating a block-level clustering service.

31. The computer program product of claim 23, wherein the type of data services is selected from the group consisting of block storage services, object storage services, file storage services, secure multi-tenancy isolation, and auditing services.

32. The computer program product of claim 23, wherein the type of data service is managed on a remotely located storage resource.

33. The computer program product of claim 23, wherein analyzing the input to determine an appropriate type of data service to provide on the data storage resource comprises associating the received input with an available type of data service on the data storage resource.

* * * * *